Figure 1:
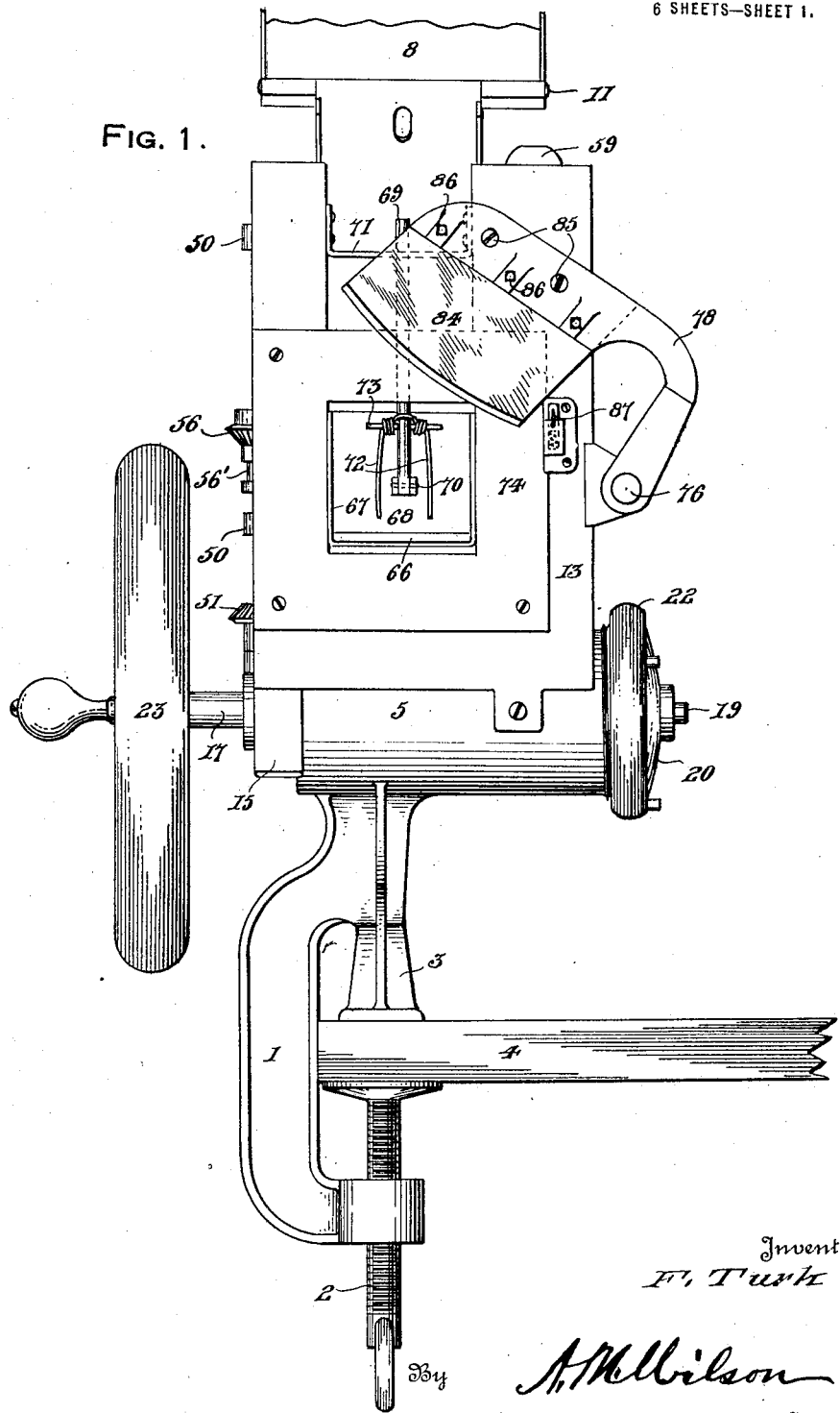

F. TURK.
NOODLE CUTTING MACHINE.
APPLICATION FILED AUG. 25, 1920.

1,404,073.

Patented Jan. 17, 1922.
6 SHEETS—SHEET 1.

Inventor
F. Turk
By A. M. Wilson
Attorney

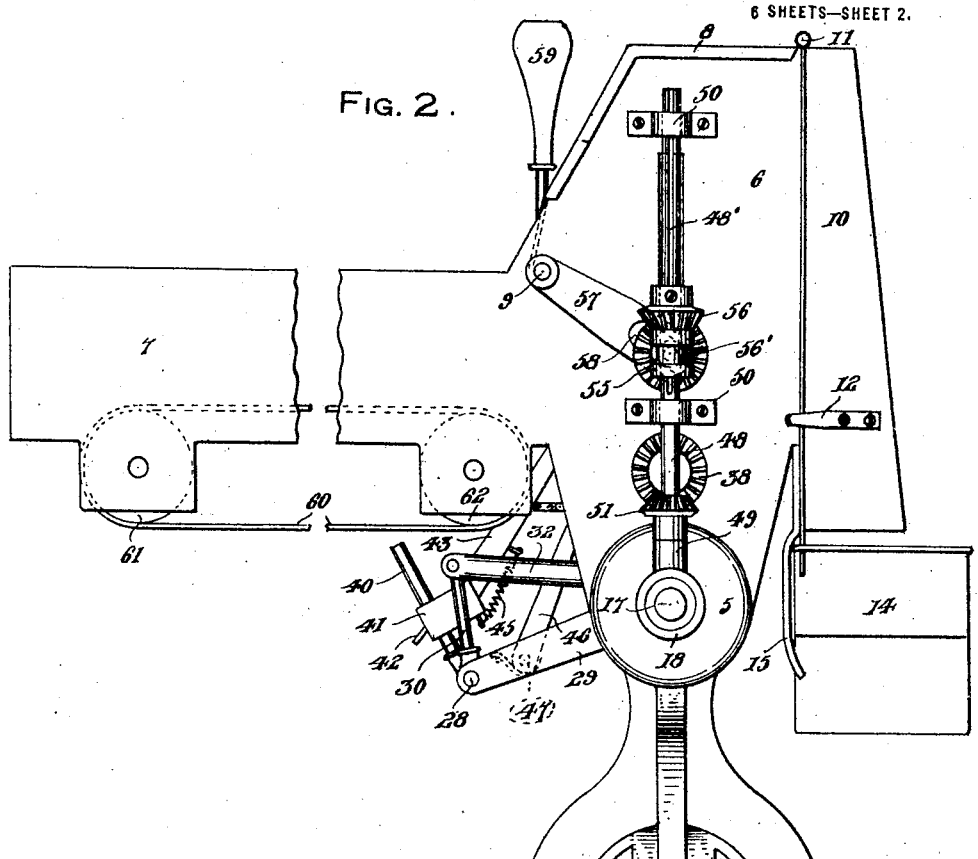
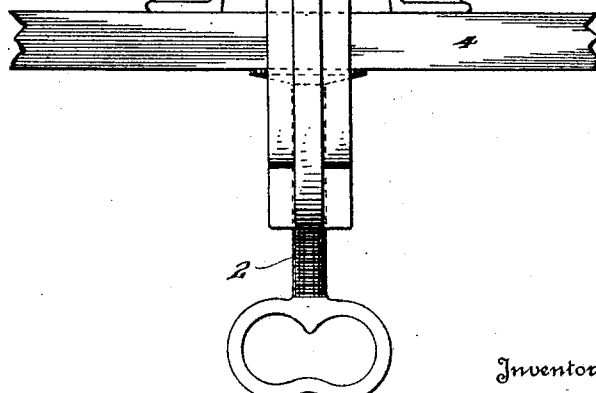
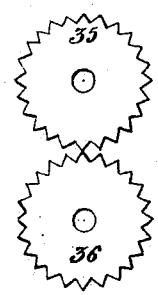

F. TURK.
NOODLE CUTTING MACHINE.
APPLICATION FILED AUG. 25, 1920.

1,404,073.

Patented Jan. 17, 1922.
6 SHEETS—SHEET 3.

Inventor
F. Turk

By A. M. Wilson
Attorney

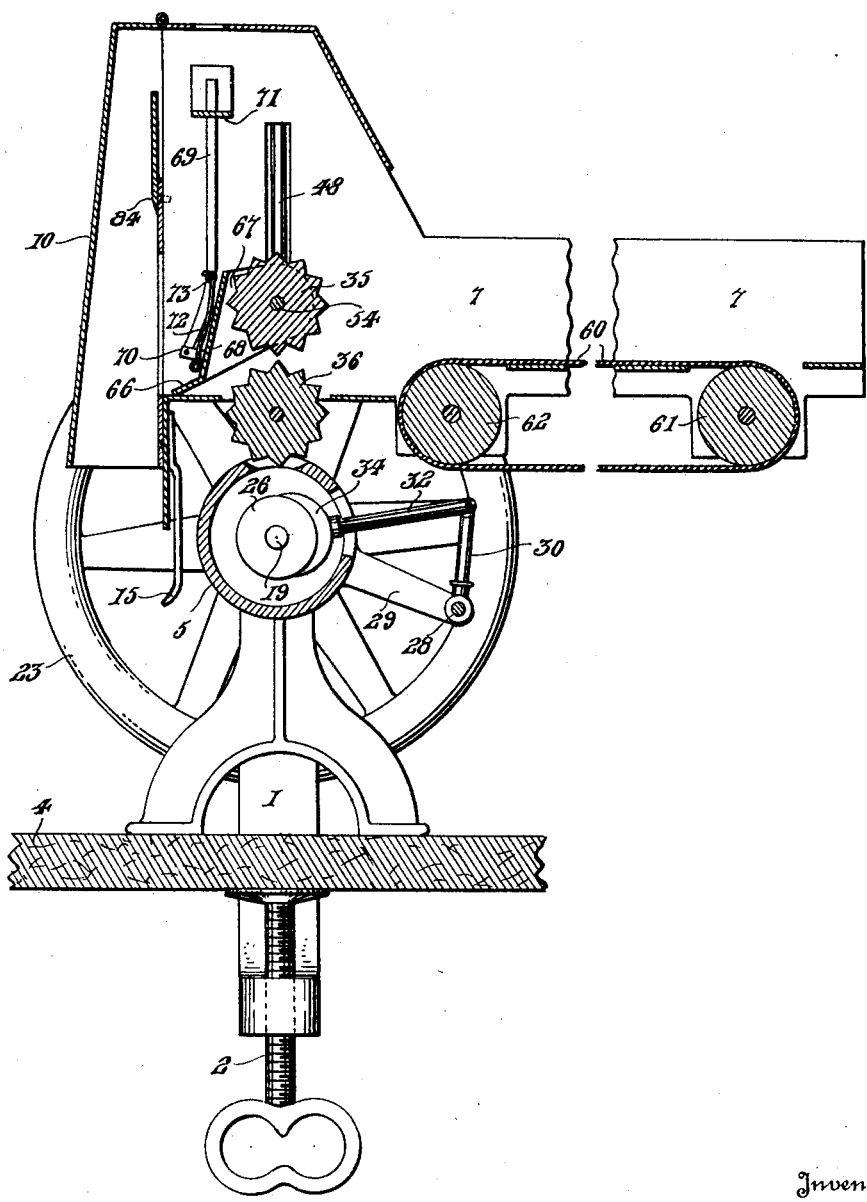

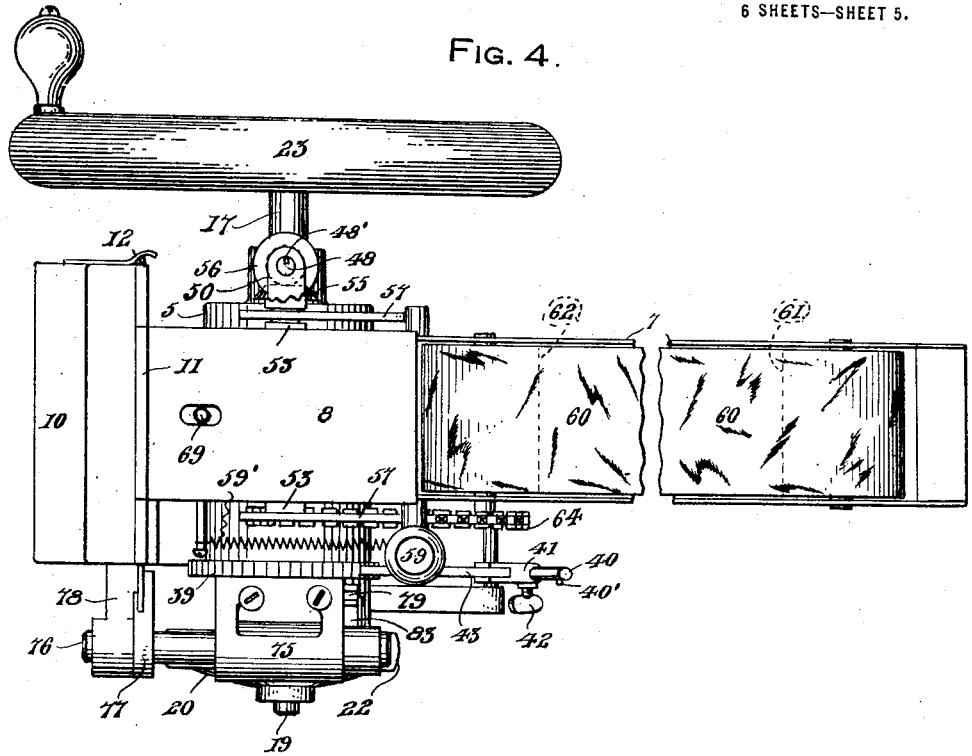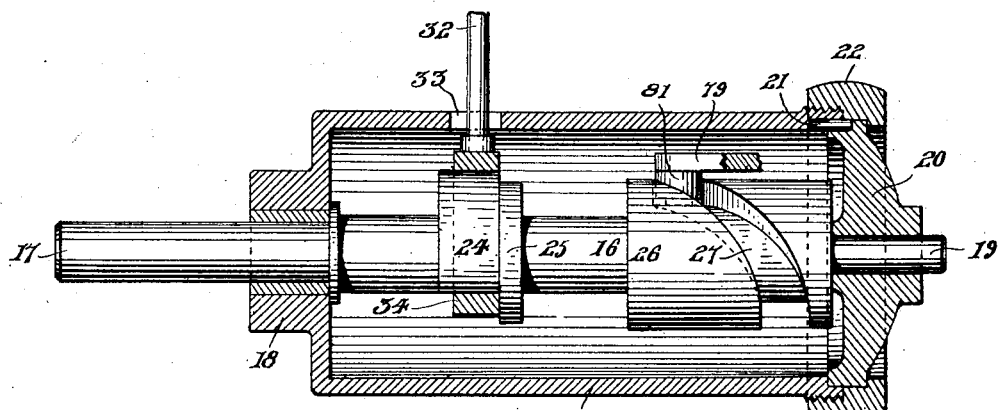

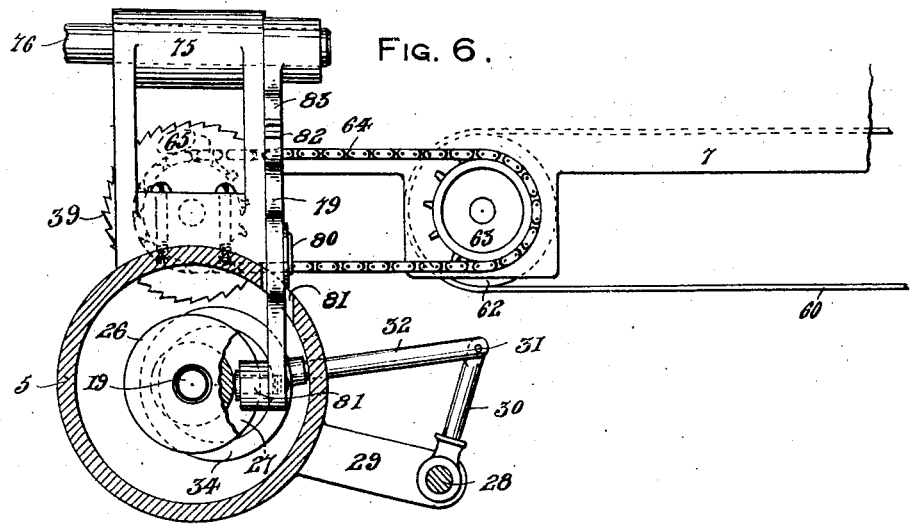
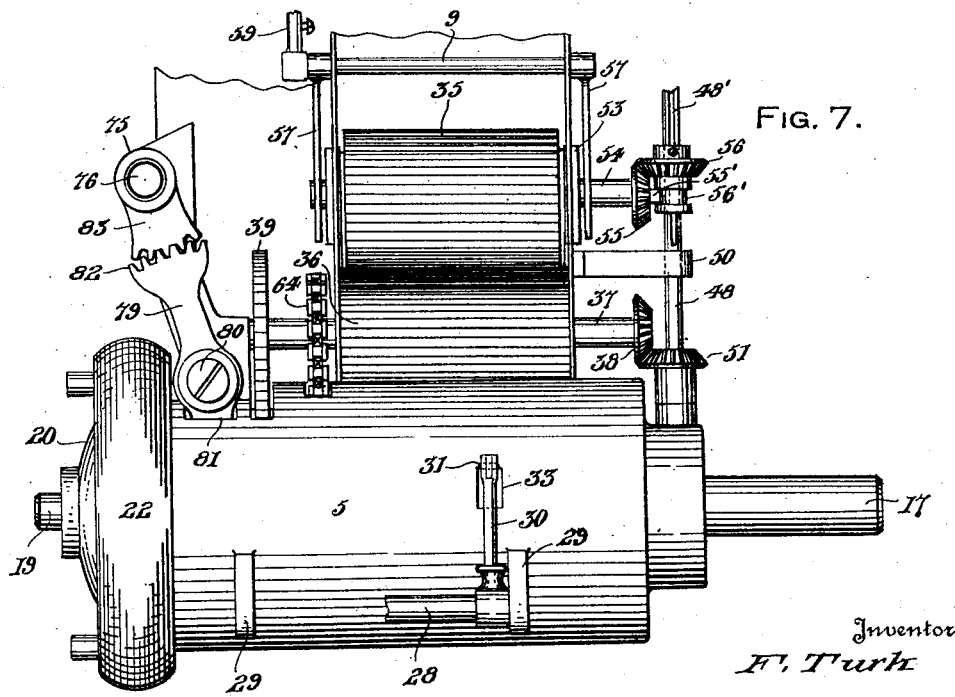

UNITED STATES PATENT OFFICE.

FRANK TURK, OF CASSELMAN, PENNSYLVANIA, ASSIGNOR OF ONE-HALF TO JOHN TURK, OF CASSELMAN, PENNSYLVANIA.

NOODLE-CUTTING MACHINE.

1,404,073.  Specification of Letters Patent.  Patented Jan. 17, 1922.

Application filed August 25, 1920. Serial No. 405,838.

*To all whom it may concern:*

Be it known that I, FRANK TURK, a citizen of Jugo-Slavia, residing at Casselman, in the county of Somerset and State of Pennsylvania, have invented certain new and useful Improvements in Noodle-Cutting Machines, of which the following is a specification.

This invention relates to certain new and useful improvements in noodle cutting machines and has for one of its objects to provide a noodle cutting machine of the portable type designed either for household or manufacturing purposes wherein the dough prepared in strip form is fed through the machine and cut into shreds of various widths.

A further object of the invention is to provide a noodle cutting machine wherein power derived from the operating shaft is employed for driving an endless feed belt, corrugated dough strip gripping rollers and a severing knife.

A further object of the invention aims to provide a noodle cutting machine wherein intermittent motion from a power shaft alternately operates the dough strip feeding mechanism and the cutting knife.

With the above and other objects in view, the present invention consists in the novel form, combination and arrangement of parts hereinafter more fully described in connection with the accompanying drawings, and in which like reference characters indicate similar parts throughout the several views.

Figures 3, 8:
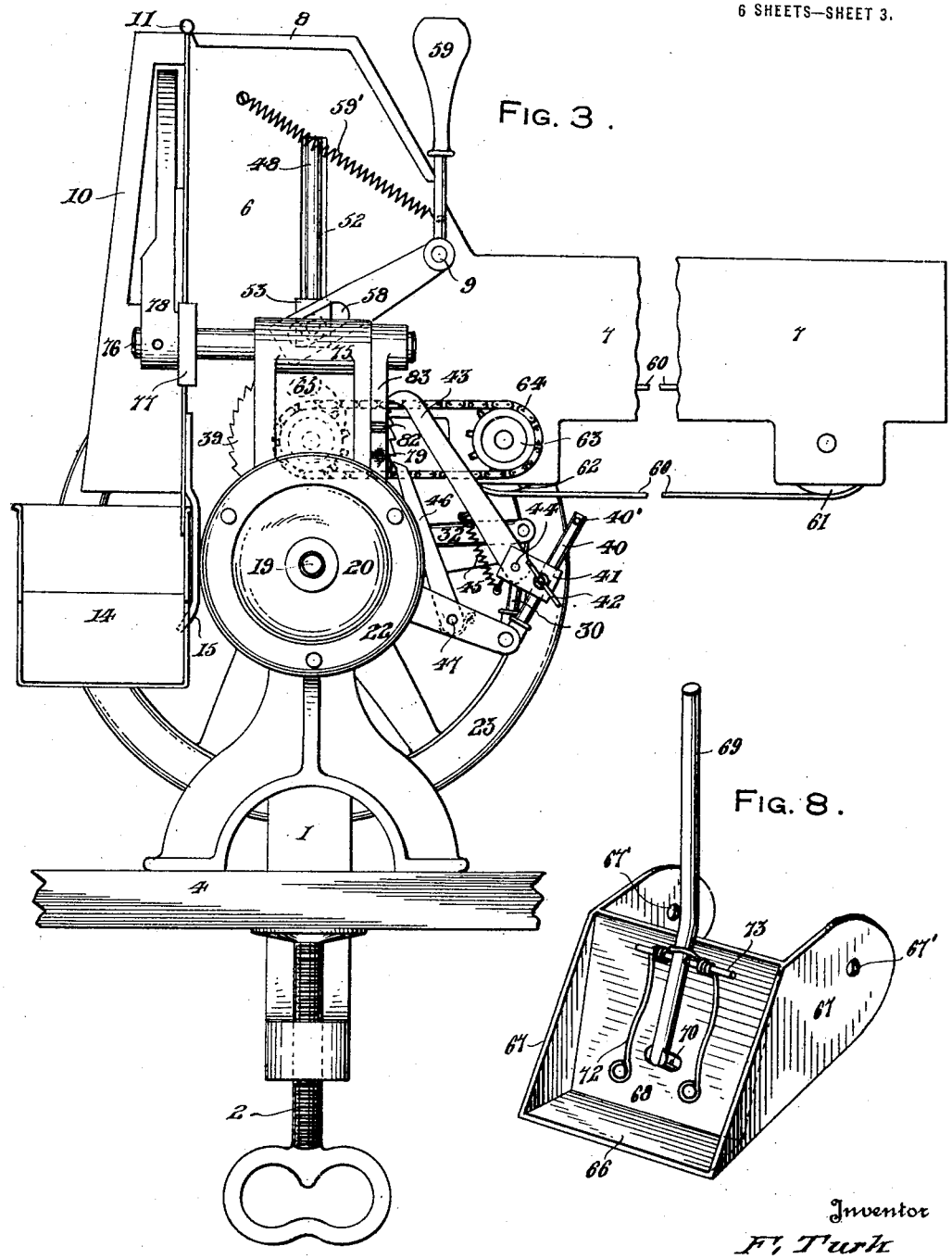

In the drawings,

Figure 1 is a front elevational view of a noodle cutting machine constructed in accordance with the present invention, the guard casing for the cutting knife being swung to an open position broken away better to show the swinging cutting knife, Figure 2 is a side elevational view, partially broken away of a noodle cutting machine showing the interconnected bevel gears for rotating one of the feed rollers splined to the roller operating shaft, Figure 3 is a side elevational view, partially broken away, of the opposite side of the machine showing the pawl and ratchet connection between the power rock shaft and one of the feed rollers, Figure 3ª is a vertical longitudinal sectional view, partly broken away, of the machine, showing the corrugated feed rollers and the smoothing shoe associated with the vertically movable feed roller, Figure 4 is a top plan view of the machine partially broken away, Figure 5 is a detail sectional view of the power shaft and cam groove and eccentric devices associated therewith, Figure 6 is a detail sectional view of a part of the operating mechanism showing the connection between the power shaft and the shaft supporting the cutting blade, Figure 7 is an elevational view, partly broken away showing the corrugated feed rollers and the driving means therefor, Figure 8 is a perspective view of the tensioned shoe for engaging the dough strip when fed through the corrugated rollers, and Figure 9 is a diagrammatic view of the feed rollers gripping the dough while passing through the machine.

Briefly described, the present invention provides a noodle cutting machine of the portable type that is manually operated, there being provided a casing with a power shaft from which motion is communicated to a rock shaft through a rock arm and eccentric connection. A pair of feed rollers is journaled in the machine, one of which is resiliently mounted with respect to the other while pawl and ratchet devices communicate motion from the rock shaft to the non-translating feed roller. A cam slot and gear segment lever extend between the power shaft and a shaft for supporting a cutting knife while an endless belt having a chain connection with the non-translating feed roller is adapted for feeding a dough strip to the feed rollers with a subsequent severing by the swinging knife. The pawl and ratchet connections between the rock shaft and the feed roller are adjustable to vary the length of feed of the dough strip, thus to change the width of the noodles being cut.

Referring more in detail to the accompanying drawings and particularly to Figures 1, 2 and 3, there is illustrated a mounting clamp 1 having an adjusting screw 2 cooperating with the feet 3 for securing the mounting clamp to a table or other support 4. A horizontal power shaft cylinder 5 is rigidly mounted upon the upper end of the clamp 1 and supports a vertical housing 6 having rearwardly directed relatively long side walls 7, the housing 6 having a sectional cover formed of a part designated by the numeral 8 overlying the housing 6 and hinged thereto upon the transverse shaft 9 while the forward part 10 of the sectional cover is hinged to the rear part as at 11 and carries a lateral spring finger 12 shown in Figures 2 and 4 for engagement with the edge of the front wall 13 of the housing 6 to hold the same in closed position. As shown in Figures 2 and 3, a trough 14 arranged at a lateral inclination has one wall thereof positioned rearwardly of the lower end of the front wall 13 of the housing while the resilient arm 15 engaging the outer side of the wall of the trough 14 retains the trough in position on the casing.

The power mechanism of the device as contained within the cylinder 5 is shown in detail in Figures 5 and 6 embodying a shaft 16 having one projecting end 17 thereof journaled in the end boss 18 of the cylinder 5 while the other end 19 of the shaft is journaled in the end closure disk 20 of the cylinder 5 that is keyed thereto as at 21 and further secured in position by the screw ring 22. A hand wheel 23 is secured to the projecting end 17 of the shaft to effect rotation thereof. For purposes presently to appear, the shaft 16 within the cylinder 5 is provided adjacent the end 17 with an eccentric 24 having a concentric collar 25 carried by the shaft juxtaposed thereto, while the end of the shaft adjacent the bearing end 19 is provided with a cylindrical block 26 having a cam groove 27 extending around the entire periphery thereof.

Power from the shaft 16 is transmitted to the rock shaft 28 journaled at its ends in bracket arms 29 projecting rearwardly of the cylinder 5 as shown in Figures 5 and 7 and to which rock shaft, a rock arm 30 is fixed and has a pivotal connection at its other end as at 31 to the rod 32 projecting through the opening 33 in the cylinder 5 and carrying upon the inner end thereof a band ring 34 sleeved upon the eccentric 24 as clearly shown in Figures 5 and 6.

The dough strip feeding rollers 35 and 36 diagrammatically shown in Figure 9, and in elevation in Figure 7 embodies a non-translating rotatable mounting for the lower feed roller 36, this shaft being designated by the numeral 37 journaled in the side walls of the housing 6 and projecting laterally thereof with a bevel gear 38 fixed to one end while a ratchet wheel 39 is carried by the other end. To communicate motion from the rock shaft 28 to the shaft 37, a second rock arm 40 is fixed to the rock shaft 28 and has a block 41 slidable thereon and retained in adjusted position by the set screw 42, the upward movement of the block being limited by the pin 40' carried by the rock arm 40. A relatively long pawl 43 is pivoted as at 44 to the block 41 and has the free end thereof operatively engaging the teeth of the ratchet wheel 39 as shown in Figures 3 and 4, the spring 45 extending between the block 41 and pawl 43 maintaining such connection. An escapement dog 46 resiliently mounted as at 47 upon the adjacent bracket arm 29 for the rock shaft has the free end thereof in ratcheting engagement with the wheel 39 so that retrograde movement of the ratchet wheel 39 will be prevented during the retrieving movement of the operating pawl 43. In order to provide for a simultaneous movement of the two feed rollers 35 and 36, a vertical shaft 48 shown more clearly in Figures 2 and 7 is journaled at its lower end in a bearing 49 carried by the cylinder 5 and is journaled at its upper end in the strap bearing 50 secured to the side wall of the housing 6. A bevel gearing 51 is fixed to said shaft 48 and is in constant mesh with the bevel gear 38, motion thereby being communicated from the shaft 37 supporting the feed roller 36 to the vertical shaft 48. As shown in Figures 2, 3, and 7, the opposite side walls of the housing 6 are vertically slotted as at 52 to provide guide slots for the bearing blocks 53 in which is journaled a shaft 54 that carries the feed roller 35, the shaft projecting from each side of the housing and carrying upon the end thereof adjacent the vertical shaft 48, a bevel gear 55. The vertical shaft 48 above the lower strap bearing 50 has a longitudinal groove 48' in which is splined a bevel gear 56 carrying the depending collar that is annularly grooved as at 56' for the reception of the pin projection 55' of the bevel gear 55 thereby locking the gears 55 and 56 in constant mesh with each other. The shaft 9 to which the cover part 8 is hinged as shown in Figure 2 projects from opposite sides of the housing 6 and has fixed to each end thereof an arm 57 slotted at its outer end as at 58 for enclosing the ends of the shaft 54 while an operating handle 59 is attached to one end of the shaft for rocking the same and the slotted arms 57 to effect vertical translating movement of the shaft 54 with the gear 55 carried thereby moving the gear 56 in the spline slot 48', thereby constantly maintaining the gear connection between the shafts 48 and 54, the upper feed roller 35 being resiliently maintained in its lowered position by the spring 59' extending between the handle and the housing 6.

The dough strip is fed between the rearwardly directed side walls 7 of the housing 6 and rests upon the endless feed belt 60 passing over rollers 61 and 62, the bearing shaft of the roller 62 carrying a sprocket wheel 63 with a sprocket chain 64 driven by the sprocket wheel 65 upon the shaft 37 shown more clearly in Figures 3, 6, and 7. As the dough is fed over the belt 60 and gripped by the corrugated rollers 35 and 36, the surface of the dough is slightly roughened or corrugated by the feed rollers and further travels beneath the shoe shown more clearly in Figures 1, 3ª and 8 positioned in the forward end of the housing 6 embodying a flat bottom forward wall 66 connected by rearwardly directed side walls 67 and an intermediate rearwardly inclined vertical wall 68. The side walls 67 are provided with openings 67' through which openings the shaft 54 of the feed roller 35 passes. The shoe being pivotally mounted on the shaft 54, the vertical swinging movements thereof are guided by the rod 69 pivoted at its lower end as at 70 to the central connecting wall 68 of the shoe while the upper end thereof slidably projects through a bearing 71 shown in Figure 1 that extends between the side walls of the housing 6. Spring fingers 72 connected to a cross arm 73 carried by the rod 69 engage the wall 68 to resiliently maintain the wall 66 of the shoe lowered into resilient contact with the bottom wall of the housing.

As the dough strip is fed forwardly by the feed rollers, and beneath the shoe plate 66, the forward end of the dough strip is delivered through the central opening in the face plate 74 carried by the front wall 13 of the housing and at which point the dough is severed into narrow strips such as noodles. The cutting mechanism includes a bracket bearing 75 supported above the cylinder 5 and having a shaft 76 horizontally journaled therein, the forward end of the shaft projecting through a bearing 77 carried by the front plate 13 of the housing with a knife arm 78 fixed to the forward end thereof. As shown more clearly in Figures 5, 6, and 7, a lever 79 is pivoted as at 80 exteriorly of and adjacent the cylinder 5 and has the lower end projecting through the opening 81 in the cylinder 5 with a head 81 carried by the inner end of the lever 79 extending into the cam groove 27 in the block 26. The upper end of the lever 79 is provided with arcuate rack teeth 82 meshing with a toothed segment 83 fixed to the inner end of the shaft 76. The knife arm 78 has a blade 84 fastened thereto as by rivets 85 while the screws 86 carried by the arm engage the blade to force the same into frictional contact with the face plate 74 of the housing.

From the above detail description of the invention it is believed that the construction and operation will at once be apparent, it being noted that the power shaft 16 is rotated by the hand wheel 23 and through the medium of the rod connection 32 the rock shaft 28 is oscillated. The pawl and ratchet connections between the rock shaft 28 and the shaft 37 effects a rotation of the shaft 37 while the dog 46 prevents retrograde movement of the ratchet wheel while the pawl 53 is retrieving under the influence of the spring 45. The gear connections between the shafts 37 and 48 effects rotation of the shaft 54 carrying the feed roller 35 while said roller and the immediate driving gears associated therewith is vertically shiftable in the housing 6 by operating the lever 59. The sprocket chain connection between the shaft 37 and the feed roller 62 causes a simultaneous operation of the feed belt 60 and the feed rollers 35 and 36. The roller 35 and shoe 66 are simultaneously elevated to permit the initial passage of the dough strip between the feed rollers after which the slightly corrugated or roughened surface upon the dough strip as delivered from the rollers is smoothed by the foot wall 66 of the shoe. The dough strip fed forwardly of the shoe is delivered through the opening in the face plate 74 and is severed by the blade 84 of the swinging knife arm 78. To cushion the lower extreme movement of the arm 78, a tensioned pin 87 is arranged in the path of the arm to absorb the shock at the lower end of the movement. The knife arm 78 is oscillatingly swung upon the shaft 76 by the lever 79 having the head 81 thereof extending into the cam groove 27 of the blocks 26. It will therefore be seen that an intermittent motion is simultaneously given to the feed belt and feed rollers and the cutting blade 84. The cut strips of dough or noodles are delivered into the inclined trough 14 and may be gathered therefrom in any desired manner. The spring fingers 72 being relatively weak, the forward passage of the dough beneath the shoe is not retarded but is only engaged by the shoe with sufficient force to partially smooth the roughened surface thereof. The cover sections 8 and 10 of the housing may be moved upon the shaft 9 to permit access to the feeding rollers and cutting knife for purposes of repairing or cleaning.

While there is herein shown and described the preferred embodiment of the invention, it is nevertheless to be understood that minor changes may be made therein without departing from the spirit and scope of the invention.

What is claimed as new is:

1. A noodle cutting machine of the class described comprising a dough strip supporting belt, gripping rollers for the dough strip arranged forwardly of the belt, a tensioned shoe beneath which the dough strip is delivered from the feed rollers, means for simultaneously elevating one of the feeding rollers and the tensioned shoe, a cutting plate swingingly mounted in advance of the tensioned shoe and means for operating the feeding devices and cutting blade.

2. A noodle cutting machine of the class described comprising a dough strip supporting belt, gripping rollers for the dough strip arranged forwardly of the belt, a tensioned shoe beneath which the dough strip is delivered from the feed rollers, means for simultaneously elevating one of the feeding rollers and the tensioned shoe, a cutting plate swingingly mounted in advance of the tensioned shoe, a power shaft journaled beneath the feed rollers, connections between the power shaft and one of the feed rollers and connections between the power shaft and the cutting blade.

3. A noodle cutting machine of the class described comprising a dough strip supporting belt, gripping rollers for the dough strip arranged forwardly of the belt, a tensioned shoe beneath which the dough strip is delivered from the feed rollers, means for simultaneously elevating one of the feeding rollers and the tensioned shoe, a cutting plate swingingly mounted in advance of the tensioned shoe, a power shaft journaled beneath said feed rollers, a rock shaft journaled adjacent the power shaft, an eccentric and rock arm connection between the power and rock shafts, pawl and ratchet faces connecting the rock shaft to one of the feed rollers and connections between the power shaft and cutting blade.

4. A noodle cutting machine of the class described comprising a dough strip supporting belt, gripping rollers for the dough strip arranged forwardly of the belt, a tensioned shoe beneath which the dough strip is delivered from the feed rollers, means for simultaneously elevating one of the feeding rollers and the tensioned shoe, a cutting plate swingingly mounted in advance of the tensioned shoe, a power shaft journaled beneath said feed rollers, a rock shaft journaled adjacent the power shaft, an eccentric and rock arm connection between the power and rock shafts, pawl and ratchet faces connecting the rock shaft to one of the feed rollers, an oscillating shaft for supporting the cutting blade, a lever having a cam slot connection with the power shaft and communicating oscillating motion to the oscillating shaft.

5. A noodle cutting machine of the class described comprising a dough strip supporting belt, gripping rollers for the dough strip arranged forwardly of the belt, a tensioned shoe beneath which the dough strip is delivered from the feed rollers, means for simultaneously elevating one of the feeding rollers and the tensioned shoe, a cutting plate swingingly mounted in advance of the tensioned shoe, a power shaft journaled beneath said feed rollers, a rock shaft journaled adjacent the power shaft, an eccentric and rock arm connection between the power and rock shafts, pawl and ratchet faces connecting the rock shaft to one of the feed rollers, an oscillating shaft for supporting the cutting blade, a lever having a cam slot connection with the power shaft and communicating oscillating motion to the oscillating shaft, the eccentric and cam slot in the power shaft being relatively disposed to cause intermittent motion of the feed devices and cutting blade.

6. A noodle cutting device of the type described comprising a cylinder, a housing mounted thereon, dough strip feeding rollers journaled in said housing, a power shaft journaled in said cylinder, a rock arm having an eccentric connection with said power shaft, operative connections between said rock arm and one of said feed rollers for intermittently rotating the feed roller, an oscillating shaft journaled above said cylinder, a cutting blade carried thereby and connections between said oscillating shaft and power shaft.

7. A noodle cutting device of the type described comprising a cylinder, a housing mounted thereon, dough strip feeding rollers journaled in said housing, a power shaft journaled in said cylinder, a rock arm having an eccentric connection with said power shaft, operative connections between said rock arm and one of said feed rollers for intermittently rotating the feed roller, an oscillating shaft journaled above said cylinder, a cutting blade carried thereby, a lever pivoted exteriorly of said cylinder and having the inner end extending thereinto for engagement with a cam slot in said cylinder, a rack segment carried by the oscillating shaft and rack teeth carried by the upper end of said power shaft operated lever for communicating motion from the power shaft to the oscillating shaft.

In testimony whereof I affix my signature.

FRANK TURK.